US006283600B1

(12) United States Patent
Levasseur

(10) Patent No.: US 6,283,600 B1
(45) Date of Patent: *Sep. 4, 2001

(54) IMAGE PROJECTION FIXTURES

(75) Inventor: Craig Levasseur, Westlake Village, CA (US)

(73) Assignee: Cooper Technologies Company, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,876

(22) Filed: Apr. 9, 1999

Related U.S. Application Data

(60) Provisional application No. 60/081,630, filed on Apr. 13, 1998.

(51) Int. Cl.[7] .................. G03B 21/14

(52) U.S. Cl. .................. 353/119

(58) Field of Search .................. 353/35, 52, 66, 353/79, 119; 362/267, 277, 294

(56) References Cited

U.S. PATENT DOCUMENTS 4,682,868 * 7/1987 Constantin et al. .................. 353/58
5,295,056 * 3/1994 Peck .................. 362/257
5,404,283 * 4/1995 Yantz et al. .................. 362/267
5,791,755 * 8/1998 Henry et al. .................. 353/120
5,947,590 * 9/1999 Meuse et al. .................. 362/264

* cited by examiner

*Primary Examiner*—Safet Metjahic
*Assistant Examiner*—E P LeRoux
(74) *Attorney, Agent, or Firm*—John E. Wagner; Sam Bernardo

(57) ABSTRACT

An image projector includes a generally cylindrical housing containing a slide or pattern holder, a fixed lens and an adjustable lens. A separate lamp house threadedly engaged with the housing contains a lamp and electrical connections to the lamp. A cylindrical forward housing or shroud is threadedly engaged with the housing at its opposite end and includes a window through which the light pattern is transmitted. Seals are incorporated adjacent to the threaded connections to assure weather tight operation. The housing is carried in a sleeve which is spaced to allow air circulation around the housing. The sleeve is carried in a yoke which permits elevational adjustment of the projector.

22 Claims, 10 Drawing Sheets

IMAGE PROJECTION FIXTURES

REFERENCE TO RELATED APPLICATION

This application relates to provisional application Ser. No. 60/081,630 filed Apr. 13, 1998.

BACKGROUND OF THE INVENTION

In the field of ornamental lighting, a recently recognized application exists in the use of large scale image projecting fixtures. These involve a permanently located fixture directed toward a large planar surface such as a building side and including not only a lamp within the fixture to illuminate the surface but provision for mounting a photographic transparency and suitable focusing optical system for projecting the image of the transparency on the wall or surface which now becomes a changeable work of art.

The basic concept is deceptively simple. In carrying out the design of such projector system, however, one must first provide a weather-tight enclosure and one, which maintains the weather tight connection when it is illuminated or not and whether exposed to sub freezing or 100-degree Fahrenheit temperature. The fixture must maintain its focus despite such temperature changes and to be relatively immune to interference by vandals.

A further need is that the exchanging of lamps and the exchanging of photographic transparencies or other image source must be clone simply and rapidly without the intervention of a skilled projectionist. Often the maintenance of exterior lighting is delegated to groundskeepers and electricians who have many other duties and are not in a position to devote much time or attention to exchanging lamps or image media while having to maintain proper focus and direction of the fixture. Often the exchange of lamps or image media might be done during daylight hours when it would be difficult and possible to precisely check the focus and direction of the fixture. Such requirements are not present for most other exterior lighting.

BRIEF DESCRIPTION OF THE INVENTION

Faced with the above state-of-the-art, it appears that it should be possible, with proper design, to make a light projector, which meets the requirements of:

1. A weather-tight housing;
2. An easily exchangeable lamp assembly;
3. An easily exchangeable photographic transparency or template mount;
4. An easily focused optical system;
5. Accepts a variety of optical filters for special effects;
6. An easily directed fixture assembly which maintains its projection field despite adverse conditions such as wind, unintentional bumping by passers by or intentional acts of vandals;
7. A fixture which maintains its focus and direction despite dramatic changes in ambient temperature;
8. A fixture in which the acts of the focusing, exchanging photographic transparencies or templates can be accomplished by regular lighting maintenance personnel;
9. Allows rotation of the projected image and exchanging lamps to be accomplished singly or at the same time without interference with any of the other adjustments; and
10. A fixture achieving each in the above the while employing relatively high light output, low wattage lamps which are capable of providing the required quality image on the projection surface.

Accomplishing all these objectives in a high quality yet economical fixture design provided a very real challenge. However the challenge was met by two different but related projector designs for different types of lamps. In the first embodiment, the projector includes the combination of a central body with the lamp housing at its rear, a photographic slide or template mount in its central section, an optical lens assembly section and an exterior front window and shroud, each of which are secured to their adjacent section by an O ring sealed joint and concealed locking screws.

To satisfy the requirements of requirement 6 above requires that structure of the light projector be as small and compact as is practical and yet physically rugged. The small size serves to make the projector relatively unobtrusive. To gain the advantage of retaining focus despite large variations in temperature requirement 7 above the rugged structure must also serve as an effective heat sink.

The lamp house is mounted to the rear without interference with the slide or template mount assembly, the optics or the sealed front shroud and window. A replacement lamp may be inserted into its socket for properly illuminating a transparency in the focal plane mount. The lamps used, ideally, include an internal reflector so that no problems of orientation of the replacement lamp with its reflector are encountered. Replacement of the rear lamp house assembly is accomplished by loosening a screw and sliding the lamp house rearward. Removing the lamp (unshown and replacing it followed by reinserting the lamp house into the central body) does not affect the transparency mounting nor the focus nor the front sealed end window. A suitable ring and locking screw secure the lamp assembly in place.

Removal of the front shroud and window by a release of its locking screw and sliding over its O ring seal exposes the optical assembly and the template or image media mount. The optical assembly is locked at its previously focused position by a setscrew and will not be affected by the removal and replacement of the transparency or template. The transparency or template mount employs spring pressure to hold the transparency or template in the focal plane.

By releasing the locking set screw in the optical system, the focus may be adjusted and locked in place and the front shroud returned to its normal position with illumination exiting by its sealed front window.

The direction of the beam from the fixture and the resulting image is determined by rotation of the fixture base about a vertical axis and about a horizontal axis in its U-shaped mount. In both cases locking screws for azimuth and elevation adjustments are concealed from view by portions of the fixture. When adjusted in azimuth and elevation angles and the locking screws engaged, the fixture is permanently focused, sealed and directed until the next service visit.

The screws securing the rear housing and optical assembly are protected from unauthorized removal by the outer sleeve. This sleeve itself is secured to the mounting yoke of the projector by concealed release locking screws.

In an alternate embodiment, rotation of the image is accomplished by a different means. The projector is secured to its support yoke by a separate tubular sleeve which surrounds the body of the projector and is secured to the body by locking screws. Unloosening the locking screws allows the entire projector body and the image produced to be rotated similar to rotation of the cross hairs of an optical sight. No seal of the projector is opened or “broken” in any image rotation adjustment.

Relamping of the alternate embodiment is accomplished by means of a locking ring and O ring seal which are merely released by unthreading the locking ring, sliding the rear housing off with the old lamp exposed, removing it and replacing it with a new lamp, sliding the rear housing into place and tightening the locking ring. None of the focus, orientation angle of the projector or the image orientation are affected.

In the alternate embodiment, the projector is thermally isolated from the supporting yoke and base by merely line and point contact engagement of the projector middle housing with the surrounding sleeve.

In both embodiments, the projector is attached to its yoke by an easily adjusted locking nut on each side of the yoke which can be released only through the unique usage of an allen wrench inserted in a tangential opening and net used as a wrench but rather as a moment arm. The lock nuts are smooth and cannot be released without the additional moment arm of the allen wrench used as an extension arm rather than a wrench. Any attempt to use an allen wrench in its normal unscrewing action only results in useless turning of the wrench. A vandal is unlikely to ascertain the necessary tool and necessary mode of release to loosen the lock nuts.

BRIEF DESCRIPTION OF THE DRAWINGS

This invention may be more clearly understood from the following detailed description and by reference to the drawings in which.

DETAILED DESCRIPTION OF THE INVENTION

Figure 1:
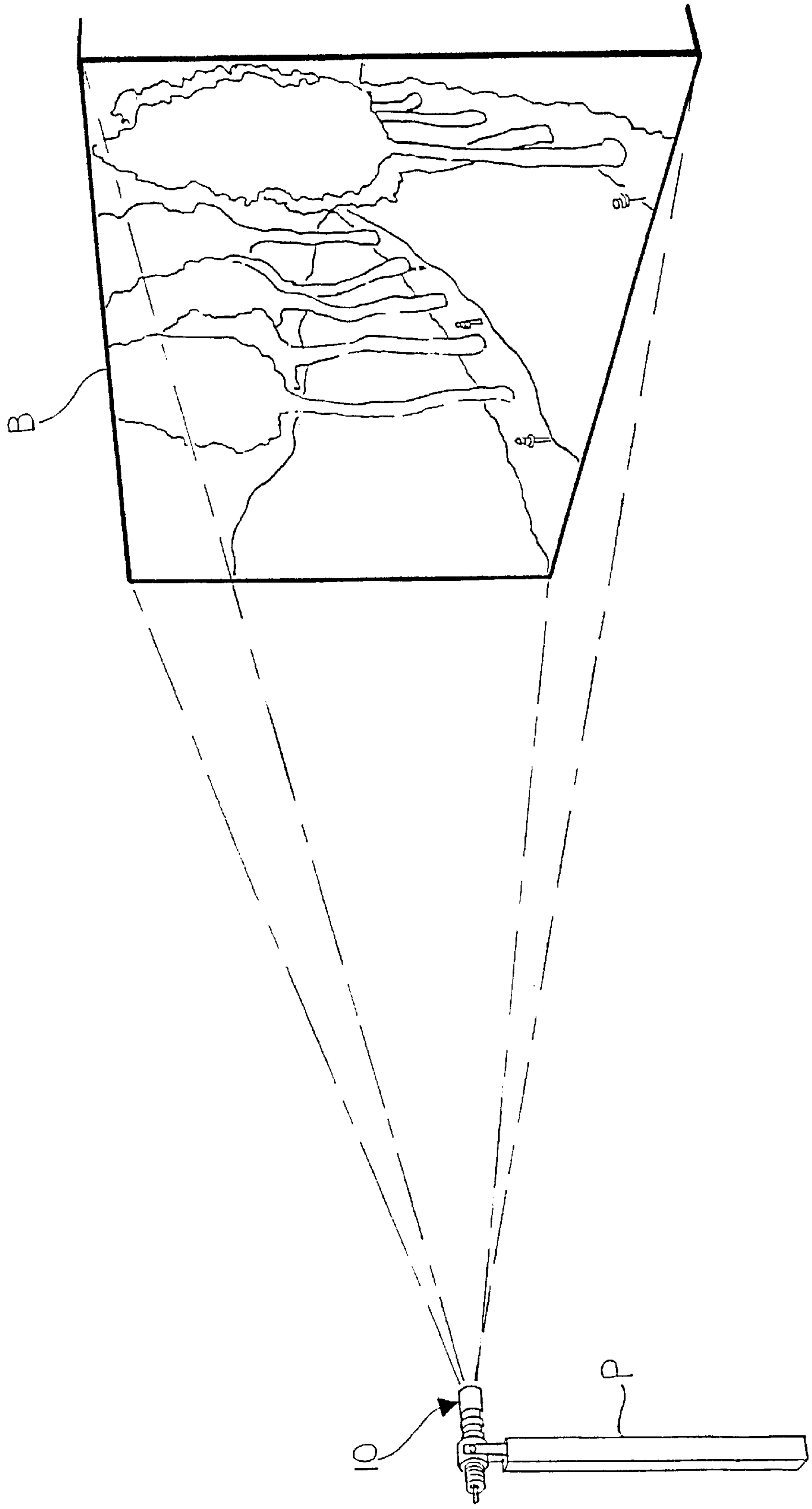
FIG. 1 is a perspective view of a lamp housing in accordance with this invention shown operating as an image projector on a building side wall.

For an understanding of this invention, reference is hereby made to FIG. 1 showing a typical installation of the projector 10 of this invention mounted on a supporting post P or other selected structure and directed toward the side of a building B or structure to project a visual pattern onto the side of the building to provide a remarkable visual image for viewers near the building B. The source of the patterns, preferably is a photographic slide or template that is interchangeable and mounted within the projector 10.

The projection field of projector 10 is defined by the dashed lines expanding from the front of the projector 10 to the building B. The location of the projector 10 and the size of any internal mask is determined to provide either the entire sidewall of the building B or any selected area as the projection screen. The projector 10 can be as supplied with conventional 115 volt 60 cycle power to operate an internal conventional off-the-shelf lamp such as a MR 16 lamp with an internal metallized reflector.

The entire housing of the projector 10 is weather proof and designed for use at permanent indoor or outdoor locations. The only need to service the projector 10 will be to change the pattern and thereby change the visual image projected on the viewing surface and to periodically change the projection lamp. Normally, these will occur only after several months of use.

Figure 2:
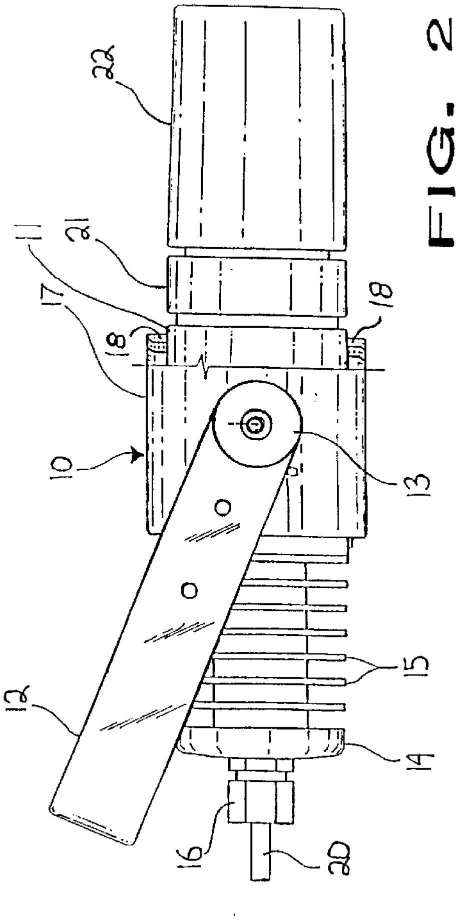
FIG. 2 is a side elevational view of the projection fixture of this invention.
Figure 2A:
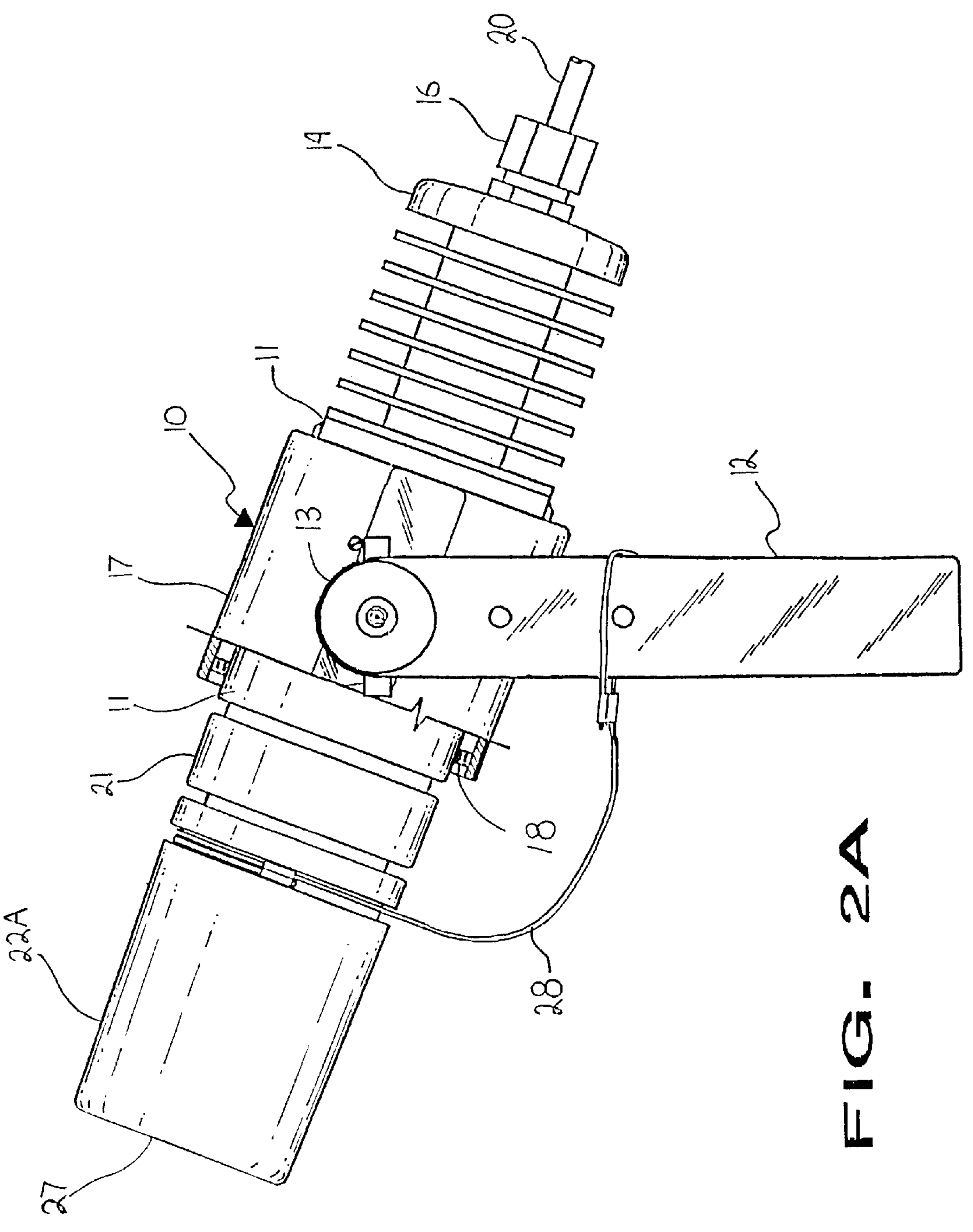
FIG. 2A is a side elevational view of the projection fixture of FIG. 2, configured for ground installation and including a safety lanyard for the removable front housing or hood member.

Now referring to FIG. 2 in combination with FIGS. 2A through 7, the projector 10 may be seen in FIG. 2 in a side elevation as including the inner housing or main body 11 which is preferably in the form of an end threaded and machined tube mounted in a sleeve 17 supported by a U-shaped bracket or yoke 12 which is readily secured by a pair of locking nuts 13 to sleeve 17, the near side nut 13 only showing in FIGS. 2 and 2A. The yoke or mounting bracket 12 may be adjusted over approximately 350 degrees of rotation to accommodate a wide range of elevational angles for the projector 10 and limited only by the power supply cable for the projector 10. The bracket 12 may also be pivoted over virtually a 360-degree range of azimuth adjustment when attached to a base or other support such as post P as illustrated in FIG. 1. Sleeve 17 is secured to the outer surface of the inner housing 11 by a series of locking screws 18 which hold the inner housing 17 a selected cross hair angle for angular adjustment of the image projected on the building B or surface. This adjustment is independent of any focusing of the image and also independent of any azimuth or elevational adjustment of the projector 10.

Secured to the main body 11, at the rear, is the base or lamp house 14 with its cooling fins 15 and its rear electrical connection and seal 16 from which emerges the power cable

20. At the opposite or front end of inner housing member 11 is the slide and lens assembly 30 and the front hood or shroud 22 containing the projection window 27 of tempered planar optical grade glass, best seen in FIG. 4.

Figure 5:
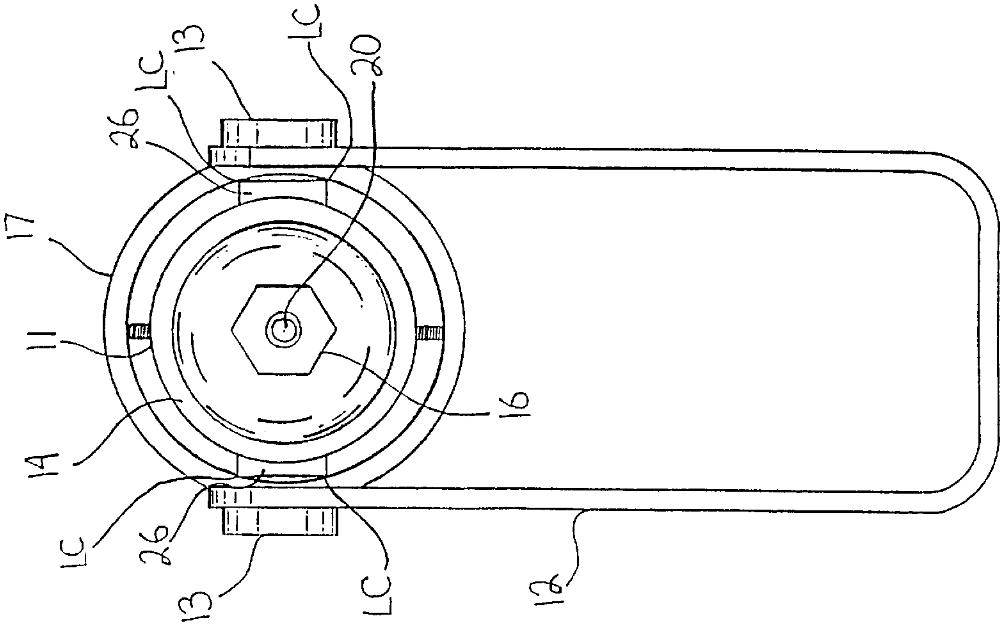
FIG. 5 is a rear elevational view of this invention.

The projector housing is thermally isolated from the yoke and a through path for air circulation is illustrated in FIG. 5. Note that there are only four lines LC and two points of contact between the outer corners of the spacers or side contact plates 26 of the inner housing 11 of FIGS. 3 and 7.

The front hood 22 is removable as is described below. In certain installations where there may be a possibility of loss or damage to this important part of projector 10, a grooved housing 22A is used, secured to the yoke 12 by a lanyard 28. This is illustrated in FIG. 2A.

Figure 3:
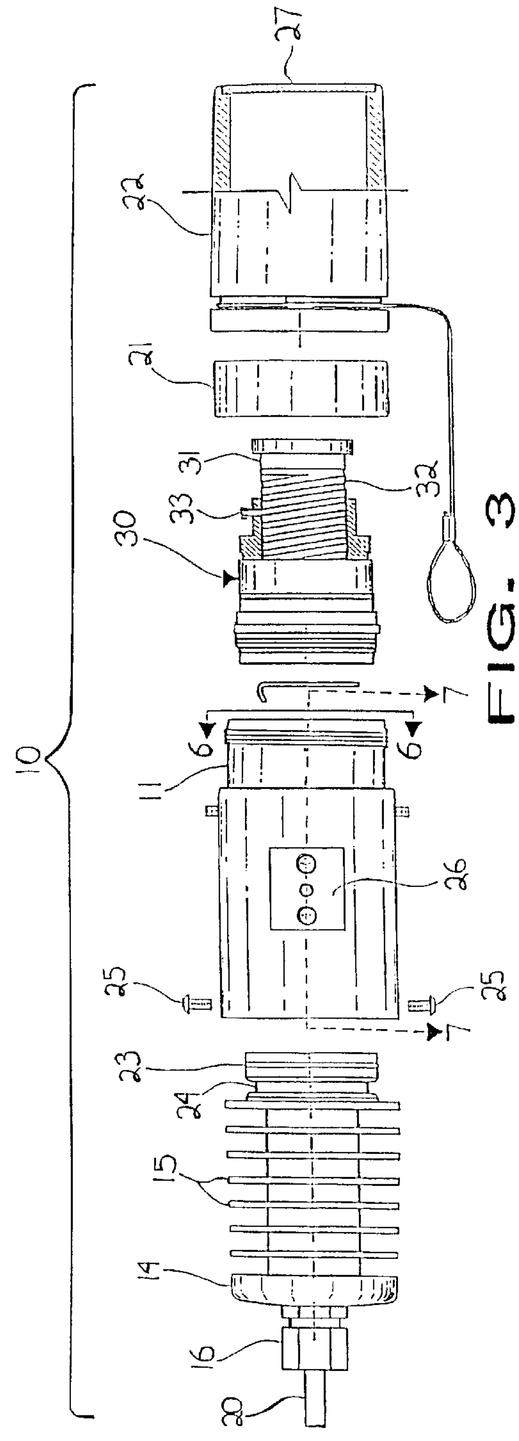
FIG. 3 is a longitudinally exploded elevational view of the fixture of this invention.
Figure 7:
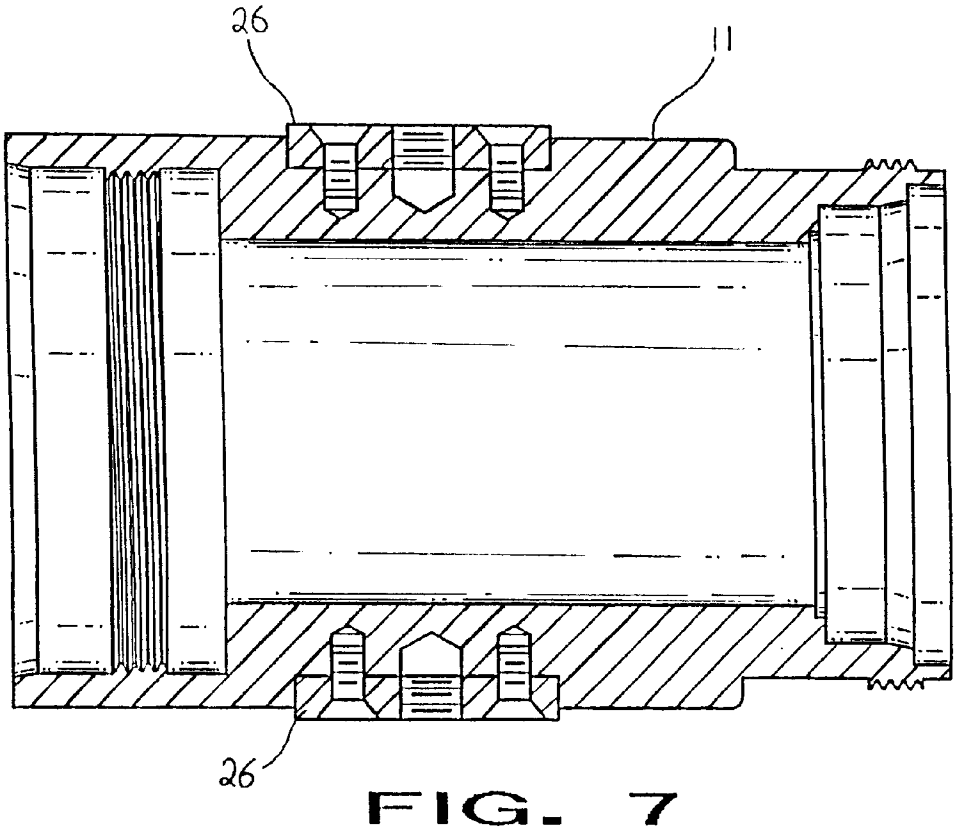
FIG. 7 is a longitudinal diametrical sectional view of the main body section of this invention taken along lines 7—7 of the FIG. 3.
Figure 6:
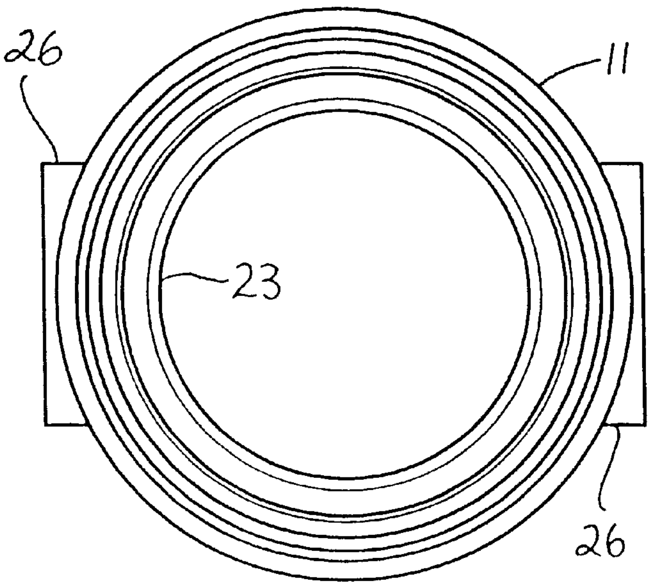
FIG. 6 is a vertical elevational view of the main body assembly of this invention and taken along line 6—6 of FIG. 3.

Each of the foregoing components of the projector may be more clearly seen in the exploded view FIG. 3. FIGS. 6 and 7 are of value for a further understanding of the inner housing and its mounting details. Referring to FIG. 3, the rear lamp housing 14 includes an O ring groove with its O ring 23 in place and a locking groove 24 into which a pair of locking screws 25 are driven through holes in the inner housing or main body 11 to hold the rear lamp assembly in sealed engagement with the rear of the main body 11. As indicated above, the sleeve 17 is tubular and includes a pair of spacers or side contact plates 26 each which in turn is in engagement with the inner face of the yoke or mounting bracket 12. This provides for a firm engagement of the projector 10 with its mounting bracket 12 and for secure locking with the locked nut 13 so that the projector 10 and the projected image do not move once the projector 10 is in place.

The lamp house 14 is mounted to the rear without interference with the slide or template mounts assembly, the optics 30 or the sealed front shroud and window 27. A replacement lamp may be inserted into its socket for properly illuminating a transparency in the focal plane mount. The lamps used, ideally, include an internal reflector so that no problems of orientation of the replacement lamp with its reflector are encountered. Replacement of the rear lamp house assembly 14 is accomplished by loosening one or more screws 25 and sliding the lamp house 14 rearward, removing the lamp (unshown and replacing it, followed by reinserting the lamp house 14 into main body) does not affect the transparency mounting nor the focus nor the front sealed end window. A suitable ring and locking screw secure the lamp assembly 14 in place.

Figure 4:
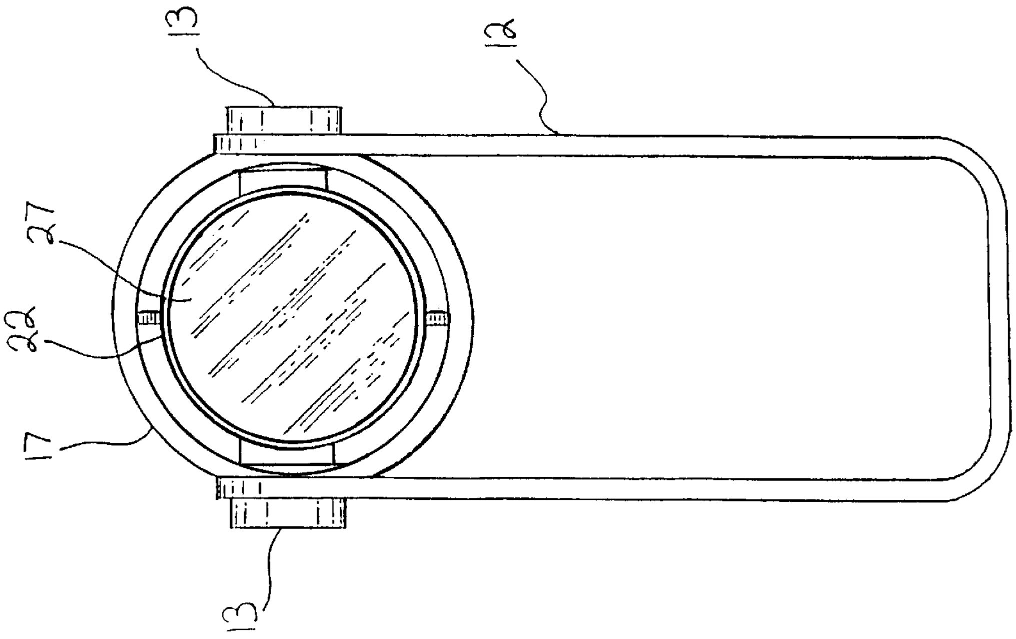
FIG. 4 is a front elevation view of the fixture of FIG. 1.

In the form shown in FIGS. 4 and 5, the side contact plates 26 have been replaced by flats machined on the outer surface of the sleeve 17. This version has the advantage of fewer parts but limits the frictional area of contact between the sleeve 17 and the yoke 12. Therefore the embodiment of FIGS. 2, 6 and 7 is preferred.

In the embodiment of FIG. 2A, the front hood is grooved to receive a cable or lanyard 28 so that the hood 22A is secured to the projector whenever it is removed to change the pattern or slide to alter the image projected. Otherwise, the projector of FIG. 2A is identical with that of FIG. 2 and thereby employs the same reference numerals to identify the same components as in FIG. 2.

The optical elements of projector 10, generally designated 30, are in an assembly which rests within the interior of the inner housing or body 11 and is positioned by a slip fit engagement and O ring sealing the body 11. The ring 21 secures the optical assembly in sealed engagement with the inner housing. The optical assembly 30 includes basically a fixed position convex tempered lens within the assembly 30 and a plano convex projection lens, unshown, contained within a focusable movable projection lens contained within its housing 31.

The projection lens housing 31 includes a helical groove 32 on its outer surface which is engaged by locking screw 33 which is released to allow focusing of the optical system and then locked to retain housing 31 in its focused condition.

Figure 14:
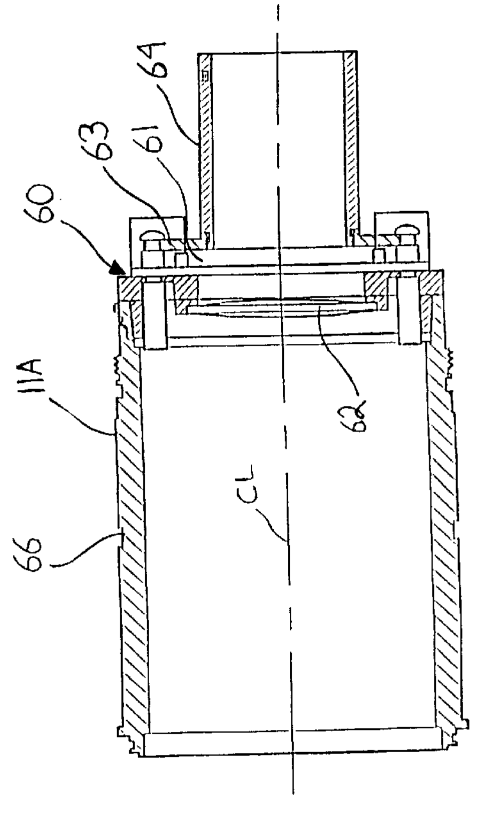
FIG. 14 is a longitudinal sectional view of the inner housing assembly of the embodiment of FIG. 8 of this invention.
Figure 14A:
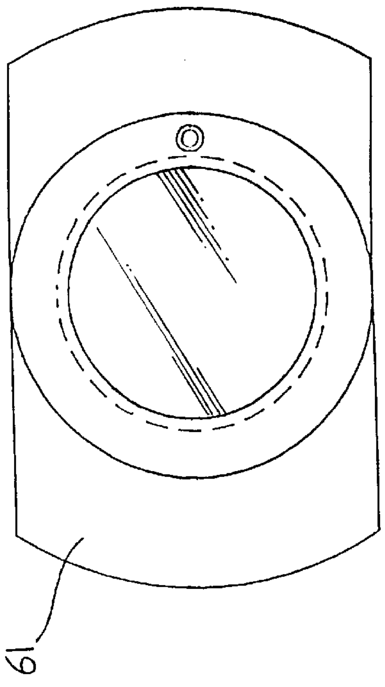
FIG. 14A is a front elevational view of a typical slide or template holder used in the projectors of this invention.

A photographic slide or template is mounted in a slide holder 61, which is best seen in FIG. 14A.

Now with an understanding of the various parts of this embodiment of this invention the features and advantages need to be reviewed. First, the fixture is waterproof not only protecting the electrical components from the dangers and damage from water intrusion but waterproof from the optical standpoint so that the image produced is protected from condensation, intruding water, or stains on optical components which could otherwise occur over a period of time.

The pattern as it appears on the projection surface may be rotated and corrected merely by loosening one screw and rotating the projector within its mount and retightening the screw. The waterproof seal is not broken in such operation.

The projector 10 may be relamped merely by removing the base 14 without affecting the focus or positioning of the projector.

A slide or template may be changed merely be removing the front housing, slipping out the old slide, slipping in a new one and reattaching the outer housing. Focus is not affected nor are any electrical elements affected.

The projector may be refocused by removing the front housing 22, loosening screw 33, manually adjusting the focus while observing the image, locking the focus with screw 33 and reattaching the front housing.

Elevation of the projector 10 may be changed by adjustment at the yoke 12 with locking knobs 13 released. Preferably, the locking knobs 13 are each secured by special set screws, which are virtually invisible to any casual viewer and releasable only with a special tool. The release of the set screws and knob 13 is the only way that the projector may be removed from the yoke 12. A high degree of security for the fixtures is thereby provided.

An Allen wrench is needed for both embodiments. One requires it for lamp housing removal. Both require it for aiming lock. No other tools other than a screwdriver are needed for all of the adjustments to be made and all of the adjustments are self evident to service personnel for easy and rapid installation and servicing.

Alternate Embodiment

Now refer to FIGS. 8 through 20, showing an alternate embodiment designed for use with a higher wattage lamp, for example the PAR 20 lamp. In these and later figures, identical parts to the earlier figures will bear the same numerical designation and somewhat modified parts from the earlier embodiment but performing basically the same functions bear the same numerical designation but with a letter suffix.

Figure 8:
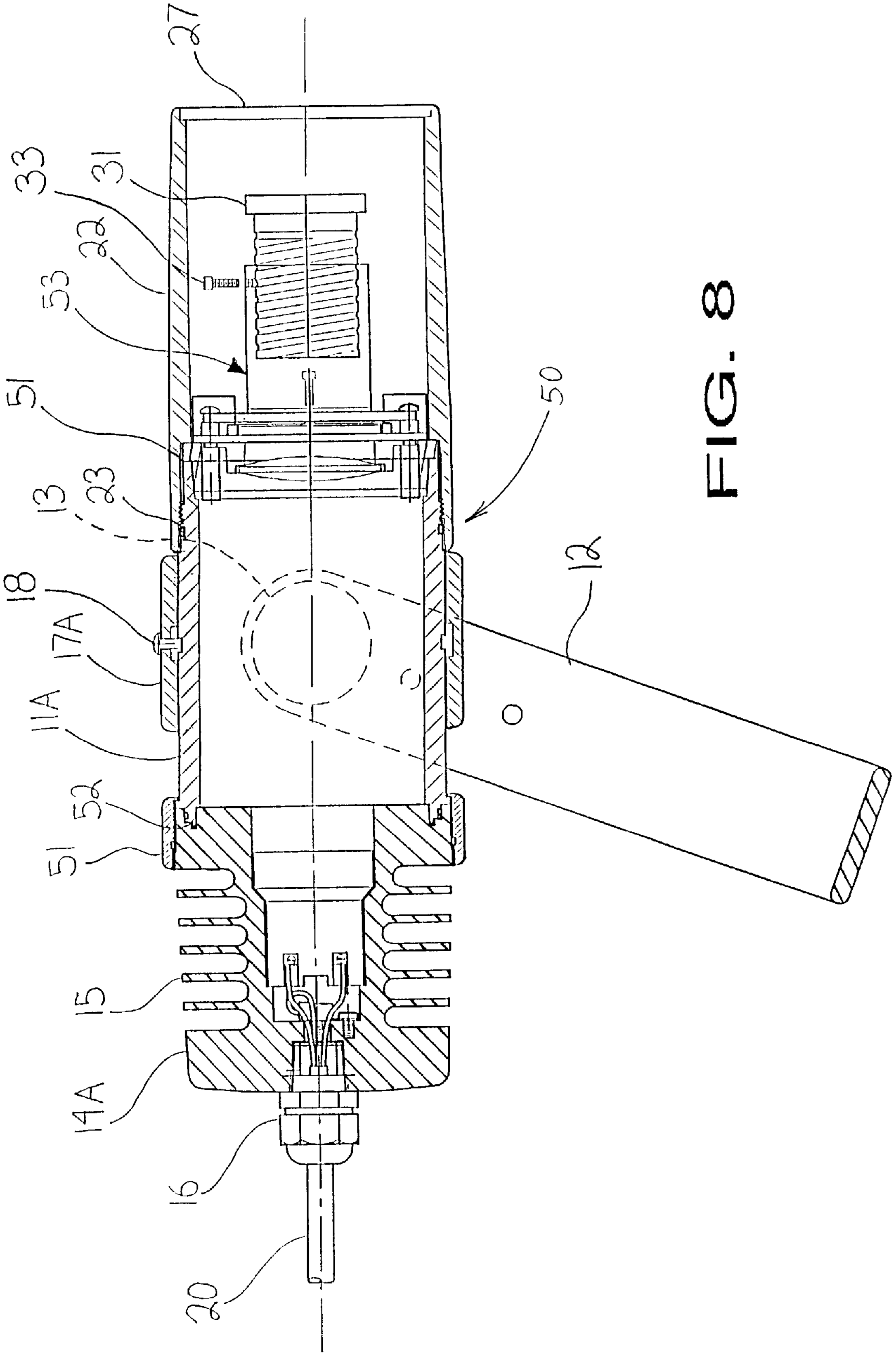
FIG. 8 is a longitudinal diametrical sectional view of an alternate embodiment of the fixture of this invention designed particularly for use with metal halide lamps.

In FIG. 8, a fixture 50 includes an inner housing 11A carrying a base or rear lamp housing 14A which is configured to receive a PAR 20 lamp to be powered through its rear seal 16 and power cord 20. The base 14A is secured and sealed to the inner housing by a locking ring 51 and O ring seal 52. The lamp contained within the base 14A may be exchanged by merely unthreading locking ring 51, sliding the base 14A back, removing the old lamp (unshown in the drawing), replacing the lamp with a new lamp and reassembling the base onto the inner housing 14A which operation reestablishes the sealed relationship of the base 14A to the inner housing 11A. This can be done without affecting the orientation of the projector 10 or its focus.

The inner housing 11A is also in sealed engagement with the front housing 22 with its window 27 by reason of the engaging threads of the front housing 22 and the inner housing 11A and O ring seal 23.

Figure 13:
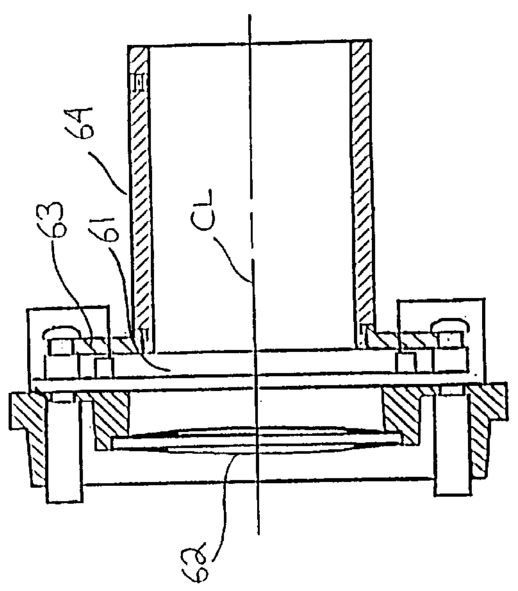
FIG. 13 is a longitudinal sectional view of the pattern holder assembly of the fixture of FIG. 8.

A removal of the front housing 22 allows access to both the optical subassemblies 53 for refocusing the projected image, if desired, and access to the slide or template assembly, best seen in FIGS. 13, 14 and 14A for changing the image to be projected. Refocusing the optical system does not affect the slide or template mounting and changing the slide or template does not affect the focus. Reengaging the front housing returns the fixture to service in sealed condition. Each of these operations requires only the skills of regular lighting maintenance personnel.

Figure 12:
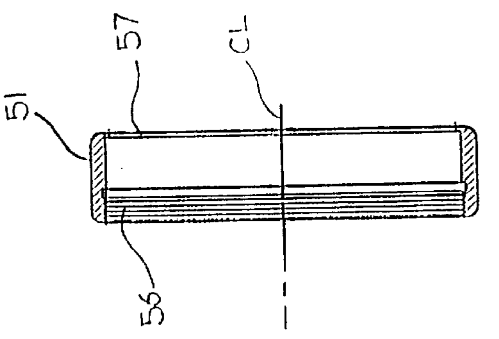
FIG. 12 is a diametrical sectional view of the locking ring of the fixture of FIG. 8.
Figure 10:
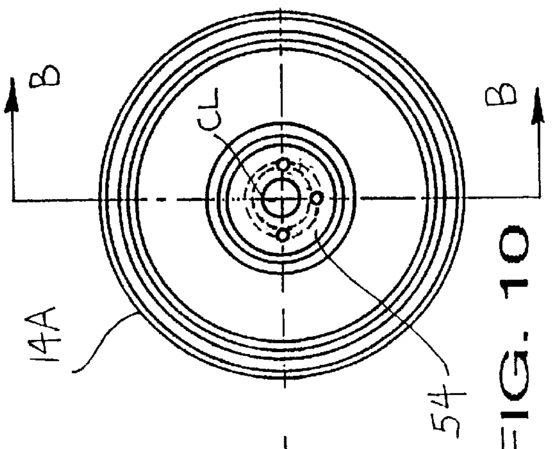
FIG. 10 is a front elevational view of the base of FIG. 9.
Figure 9:
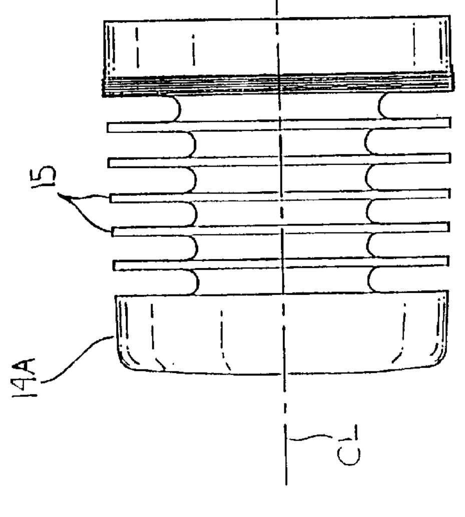
FIG. 9 is a side elevational view of the base of the fixture of FIG. 8.
Figure 11:
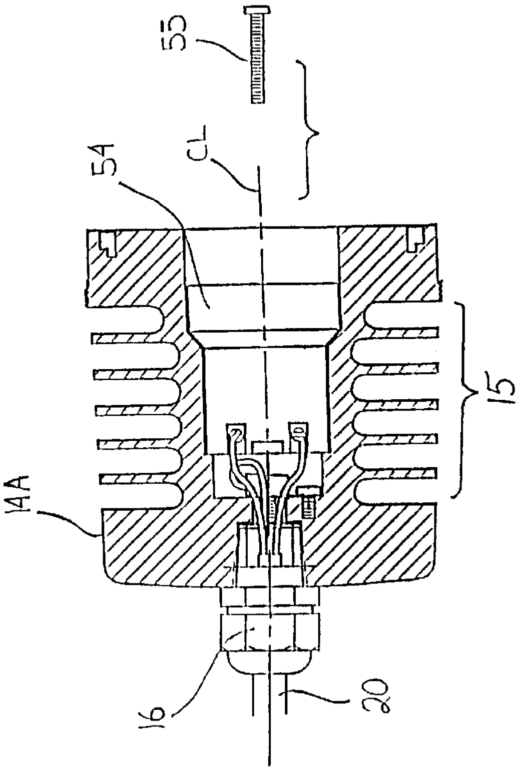
FIG. 11 is a diametrical sectional view of the base of FIG. 9 configured for a PAR 20 type lamp.

Now referring specifically to FIGS. 9 through 11, the base 14A with its cooling fins 15, may be seen in its configuration designed for use with the standard 35 watt PAR 20 120 or 277 volt metal halide lamp which is mounted in a standard socket 54 which is held in the base 14A by screw 55 or other means as shown in FIGS. 11 and 12.

The locking ring 51 with its internal threads 56 which engage the matching exterior threads of base 14A and the integral retainer ring 57 which engages the inner housing 11A may be seen in FIG. 12.

FIG. 14 shows the inner housing 11A assembled with a pattern holder assembly 60 which includes a pattern holder 61, best seen in FIG. 14A, mounts a convex lens 62 of the optical system of the projector. The pattern holder assembly also includes a plate 63 and its forward extending tube 64, which mount the projection lens mount 31 of FIGS. 8 and 17.

Figure 16:
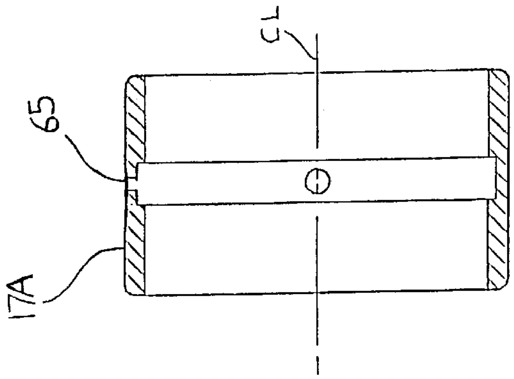
FIG. 16 is a diametrical sectional view of the sleeve of FIG. 15.
Figure 15:
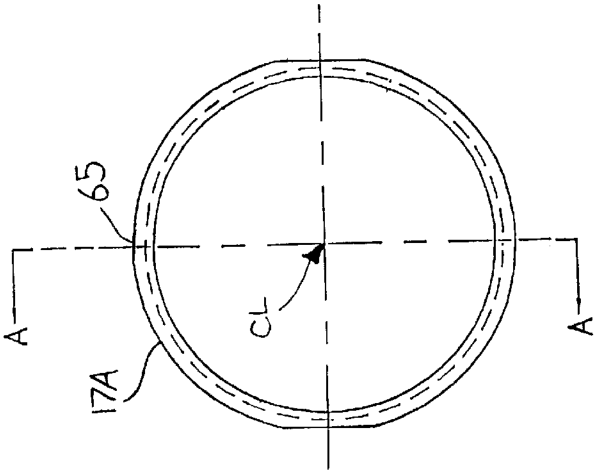
FIG. 15 is a front elevational view of the mounting sleeve of the embodiment of FIG. 8.

FIGS. 15 and 16 show the sleeve 17A which secures the projector 50 to its yoke 12 while allowing the projector to be turned about its longitudinal axis or centerline CL in order to level the image on the building B or other surface upon which the image from the projector is desired to be displayed. Rotation of the projector 50 about its centerline axis CL is accomplished by merely loosening the single screw 18 appearing in FIG. 8 which passes through the opening 65 in sleeve 17A and normally engages the inner housing 11A in its ring groove 66, best seen in FIG. 14. Retightening screw 18 secures the projector 50 at the correct image orientation.

Figure 17:
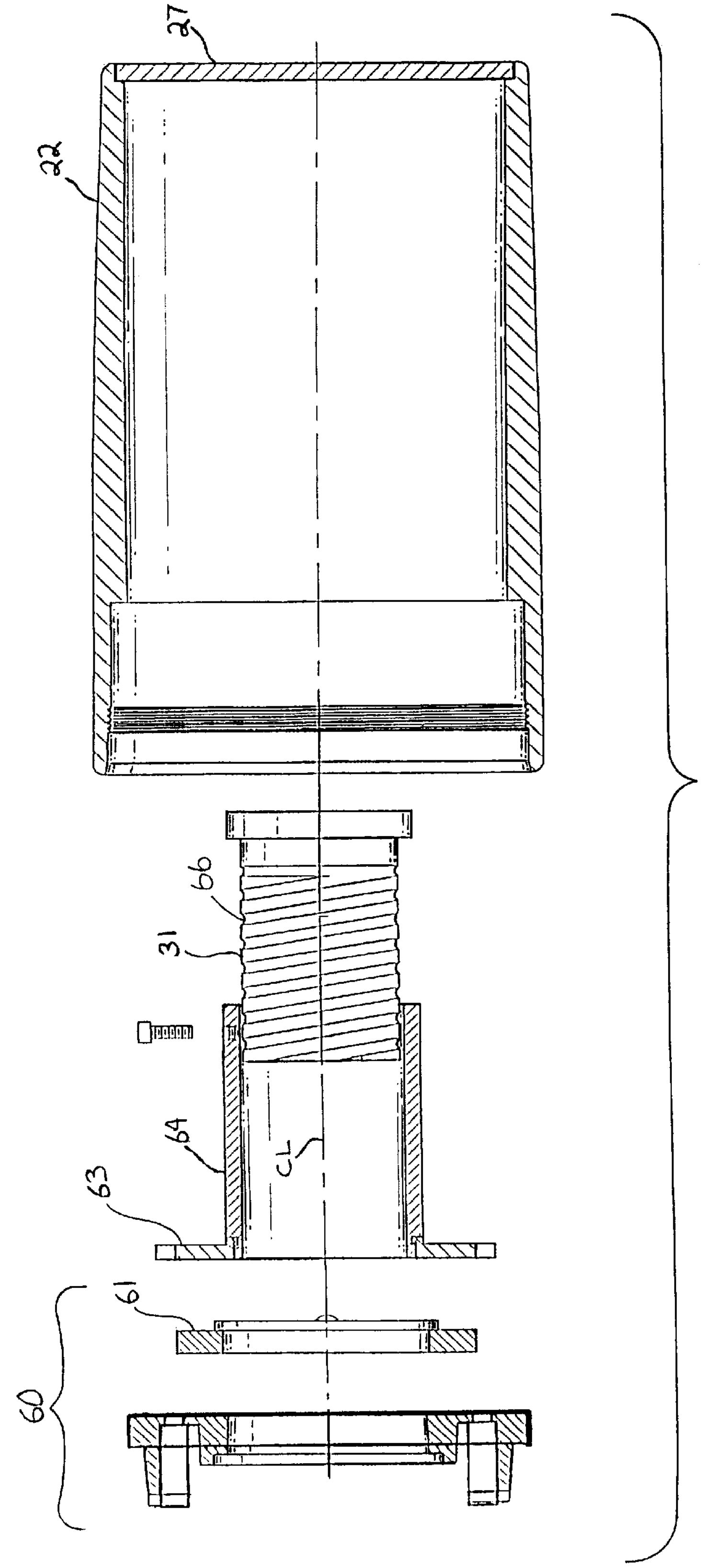
FIG. 17 is an exploded view, partly in section, of the outer housing, projection lens housing and pattern holder assembly.
Figure 18:
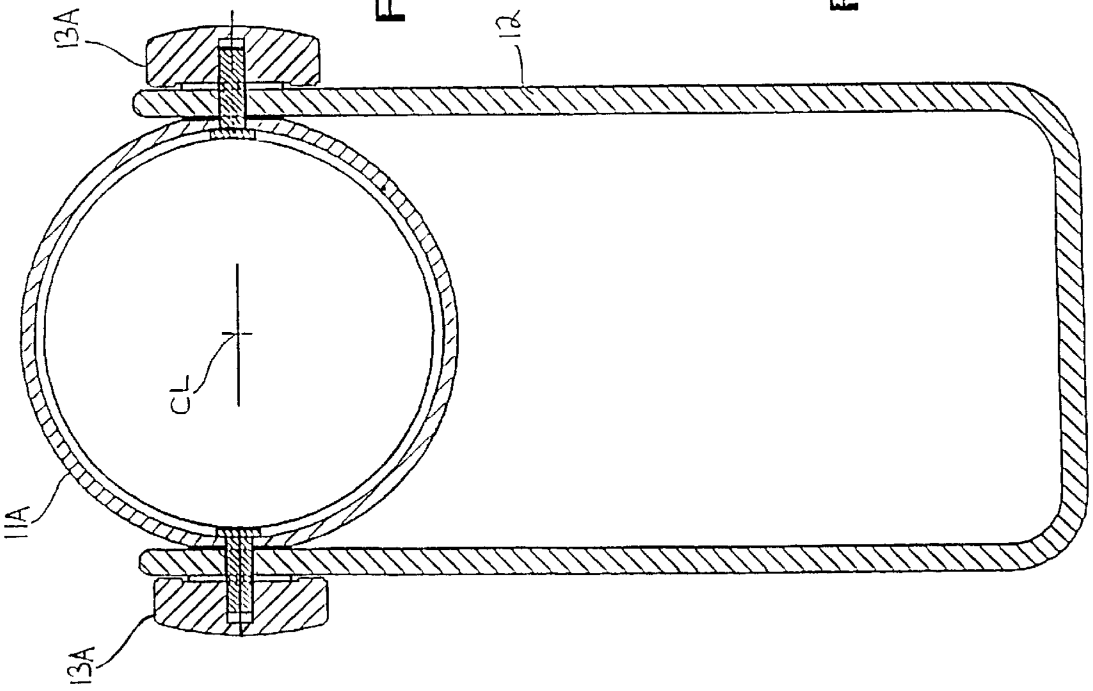
FIG. 18 is a vertical sectional view of the sleeve/yoke assembly of the fixture of FIG. 8.
Figure 19:
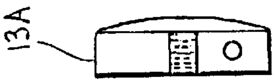
FIG. 19 is a side elevational view of a locking knob of the sleeve/yoke assembly of FIG. 18.
Figure 20:
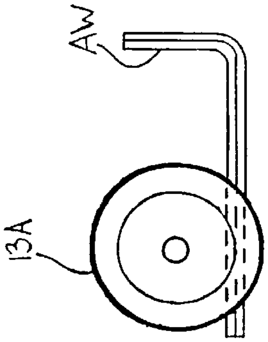
FIG. 20 is a front elevational view of the locking knob of FIG. 19.

The details of the alternate embodiment pattern assembly holder 60, the projection lens housing and the outer housing 22 may be best seen in FIG. 17. The simple step of unscrewing the outer housing 22 exposes the projection lens housing 31 for focusing the image or exchanging the slide or template. Either operation may be performed without affecting the other. Refocusing is accomplished by slightly backing off the screw 33 which normally engages the root of the helical groove 66 in projection lens housing 31, advancing or returning the projection lens to the desired focus position by observing the image on its display surface and then reengaging the screw 33. Focusing can be performed with the outer housing removed since its lens 27 does not affect the focus of the image.

Merely sliding out the old slide template in its holder 61 to one side of the projector and inserting a new slide or template performs template exchange. After completion of either focusing or slide exchange, the outer housing is merely threaded back onto the front of the inner housing and the projector is ready to return to service.

Each of the objectives set forth above and each of the advantages of the embodiment of FIGS. 1–7 are achieved by the embodiment of FIGS. 8–20.

The foregoing descriptions constitute examples of the embodiments of this invention and are considered to be representative of the principles disclosed herein but are not intended to be limiting but illustrative. It is recognized that one skilled in the art with this teaching in hand could envision other embodiments, which appear somewhat different but do not depart from the spirit and principle of our invention as described herein. Therefore, the protection afforded by this application is considered to be defined by allowed claims obtained through the prosecution of this application and with the additional protection afforded by the Doctrine of Equivalents.

What is claimed is:

1. An image projector including a generally cylindrical main body housing, and attached to said main body housing an optical assembly in said housing including a pattern holder, a fixed lens and an adjustable lens, a lamp house including a lamp secured to said lamp housing, and mounting means for supporting said projector;

characterized in that said projector further comprises a shroud having a window removably secured and in separately sealed engagement with said main body housing to provide access to said optical assembly;

said lamp house is removably secured and in separately sealed engagement with said main body housing to provide access to said lamp; and said mounting means includes a generally cylindrical sleeve spaced from said main body housing, fastening means securing said sleeve to said main body housing and a yoke pivotally secured to said sleeve;

whereby the projector lamp assembly may be relamped without unsealing the optical assembly;

and further whereby the optical assembly may be adjusted or replaced without unsealing the lamp assembly.

2. A projector as claimed in claim 1 wherein said main body housing is threadedly engaged with said shroud and said lamp house and seal means are positioned between said main body housing and said shroud and between said main body housing and said lamp house.

3. A projector as claimed in claim 1 wherein said optical assembly further includes a forwardly extending tube having fastening means and a projection lens mount movable with respect to said tube and secured in position relative to said tube by means of said fastening means.

4. A projector as claimed in claim 1 wherein said generally cylindrical sleeve is spaced from said cylindrical sealed main body housing to permit air to flow around said cylindrical sealed main body housing.

5. A projector as claimed in claim 1 wherein said generally cylindrical sleeve includes a pair of contact plates having substantially flat surfaces to which are attached said yoke.

6. A projector as claimed in claim 1 wherein said pattern holder assembly includes a pattern or slide and said shroud and said pattern or slide are removable from said generally cylindrical main body housing without affecting the adjustment of said optical assembly.

7. A projector as claimed in claim 1 wherein said lamp house is removable from said generally cylindrical main body housing without affecting the radial adjustment of said projector.

8. A projector as claimed in claim 2 wherein said seal means comprise O-ring seals carried on each end of said cylindrical main body housing.

9. An image projector comprising;

a generally cylindrical main body housing;

an optical assembly including a fixed lens, a pattern holder assembly, a housing movable with respect to said fixed lens and a projection lens within said movable housing and means securing said optical assembly to said cylindrical main body housing;

a cylindrical shroud having a window at one end threadedly engaged with said cylindrical main body housing member;

a lamp house threadedly engaged with said cylindrical main body housing including a lamp and a socket for receiving said lamp;

a generally cylindrical sleeve surrounding a portion of said cylindrical main body housing including fastener means for enabling radical adjustment of said cylindrical main body housing;

a yoke secured to said generally cylindrical sleeve to enable pivotal adjustment of said projector; and further comprising seals carried on each end of said cylindrical main body housing sealing against said cylindrical shroud and said lamp house;

whereby the projector lamp assembly may be relamped without unsealing the optical assembly;

and further whereby the optical assembly may be adjusted or replaced without unsealing the lamp assembly.

10. A projector as claimed in claim 9 wherein said fastener means comprises a plurality of set screws movable with respect to said cylindrical main body housing to permit said housing to be rotated relative to said cylindrical sleeve.

11. A projector as claimed in claim 9 wherein said cylindrical main body housing includes an annular groove on its outside surface and said fastener means in said cylindrical sleeve comprises a set screw positioned in said annular groove to permit said main body housing to be rotated relative to said cylindrical sleeve.

12. A projector as claimed in claim 9 wherein said generally cylindrical sleeve is spaced from said cylindrical main body housing to permit air to flow around said cylindrical main body housing.

13. A projector as claimed in claim 9 further comprising O-ring seals carried on each end of said cylindrical main body housing sealing against said cylindrical shroud and said lamp house.

14. A projector as claimed in claim 9 wherein said generally cylindrical sleeve includes a pair of contact plates having substantially flat surfaces to which are attached said yoke.

15. A projector as claimed in claim 9 wherein said lamp house is attached out the opposite end of said cylindrical main body housing form said optical assembly and is removable from said generally cylindrical main body housing without affecting the adjustment of said optical assembly.

16. A projector as claimed in claim 9 wherein said pattern holder assembly includes a pattern holder, a forwardly extending tube having a set screw and a projection lens mount movable with respect to said tube and secured in position relative to said tube by means of said set screw.

17. An image projector comprising:

a generally cylindrical main body housing, a shroud attached to said main body housing including a window;

an optical system including a light source, a pattern holder with a pattern or slide and a lens system within said shroud for projecting a beam of light through said window including focusing means for varying the focus of said beam at a distance from said main body housing;

mounting means for supporting said main body housing including a sleeve surrounding said cylindrical main body housing and fastening means for securing said sleeve to said main body housing, said fastening means being adjustable to permit radial adjustment of said main body housing without affecting the focus of said beam of light;

said light source includes a generally cylindrical lamp house secured to said cylindrical main body housing and seal means positioned between said cylindrical main body housing and said lamp house; and said optical system is secured to said cylindrical main body housing and said shroud is secured to said main body housing, and seal means positioned between said main body housing and said shroud;

whereby the projector lamp assembly may be relamped without unsealing the optical assembly;

and further whereby the optical assembly may be adjusted or replaced without unsealing the lamp assembly.

18. A projector as claimed in claim 17 wherein said mounting means further comprises a yoke secured to said sleeve for enabling pivotal adjustment of said cylindrical main body housing.

19. A projector as claimed in claim 17 wherein said optical system further includes a forwardly extending tube having a fastening means and a projection lens mount movable with respect to said tube and secured in position relative to said tube by means of said fastening means.

20. A projector as claimed in 17 wherein said sleeve is spaced from said cylindrical main body housing and said fastening means includes set screws movable with respect to said cylindrical main body housing to permit said main body housing to be rotated relative to said sleeve.

21. A projector as claimed in claim 9 wherein said cylindrical main body housing includes an annular groove on its outside surface and said fastener means in said cylindrical sleeve comprises a set screw positioned in said annular groove to permit said main body housing to be rotated 360° relative to said cylindrical sleeve.

22. A projector as claimed in 17 wherein said sleeve is spaced from said cylindrical main body housing and said fastening means includes set screws movable with respect to said cylindrical main body housing to permit said main body housing to be rotated 360° relative to said sleeve.

* * * * *